United States Patent
Inoue et al.

(10) Patent No.: US 7,105,771 B2
(45) Date of Patent: *Sep. 12, 2006

(54) TORCH CABLE ACCOMMODATING STRUCTURE OF ARC WELDING ROBOT

(75) Inventors: Toshihiko Inoue, Yamanashi (JP); Kazutaka Nakayama, Yamanashi (JP); Masahiro Hagihara, Yamanashi (JP); Takeshi Tsumura, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 156 days.

This patent is subject to a terminal disclaimer.

(21) Appl. No.: 10/753,565

(22) Filed: Jan. 9, 2004

(65) Prior Publication Data

US 2004/0144764 A1 Jul. 29, 2004

(30) Foreign Application Priority Data

Jan. 23, 2003 (JP) ............................. 2003-014942

(51) Int. Cl.
*B23K 9/12* (2006.01)
(52) U.S. Cl. ............................. 219/125.1; 219/137.9; 901/42
(58) Field of Classification Search ............. 219/125.1, 219/137.9; 901/42
See application file for complete search history.

(56) References Cited

U.S. PATENT DOCUMENTS

| | | | | |
|---|---|---|---|---|
| 4,539,465 A | * | 9/1985 | Bosna | 219/137.7 |
| 5,274,213 A | * | 12/1993 | Sartorio | 219/125.1 |
| 6,335,510 B1 | * | 1/2002 | Carbines | 219/125.1 |
| 2006/0000817 A1 | * | 1/2006 | Inoue et al. | 219/125.1 |

FOREIGN PATENT DOCUMENTS

| | | | |
|---|---|---|---|
| DE | 297 20 048 | * | 3/1999 |
| DE | 297 20 048 U1 | * | 3/1999 |
| JP | 60-56179 U | | 4/1985 |
| JP | 64-54976 U | | 4/1989 |
| JP | 4-17366 U | | 2/1992 |
| JP | 5-28563 U | | 5/1993 |
| JP | 9-141434 A | | 6/1997 |
| JP | 9-216189 | | 8/1997 |
| JP | 11-77306 | * | 3/1999 |
| JP | 2001-260069 A | | 9/2001 |

OTHER PUBLICATIONS

Patent Abstracts of Japan of JP 59061573, published Apr. 7, 1984.
Patent Abstracts of Japan of JP 11077306, published Mar. 23, 1999.
Patent Abstracts of Japan of JP 09141434, published Jun. 3, 1997.
Patent Abstracts of Japan of JP 2002086381, published Mar. 26, 2002.
Office Action for corresponding Japanese Application No. 2003-014942 dated Nov. 24, 2005.

* cited by examiner

*Primary Examiner*—Kevin P. Kerns
(74) *Attorney, Agent, or Firm*—Staas & Halsey LLP

(57) ABSTRACT

A first wrist element is provided at a distal end of a front arm of an arc welding robot rotatably about a first axial line, a second wrist element is provided on the first wrist element rotatably about a second axial line, and a welding torch is supported on the second wrist element about a third axial line. A slide mechanism which can reciprocate in a direction approximately parallel to the first axial line is provided at a proper position from an upper portion of the front arm to an upper portion of the first wrist element and a wire feeding apparatus is mounted on the slide mechanism. By sliding the position of the wire feeding apparatus in response to the attitude of the welding torch, an extending state of the torch cable can be maintained properly.

8 Claims, 6 Drawing Sheets

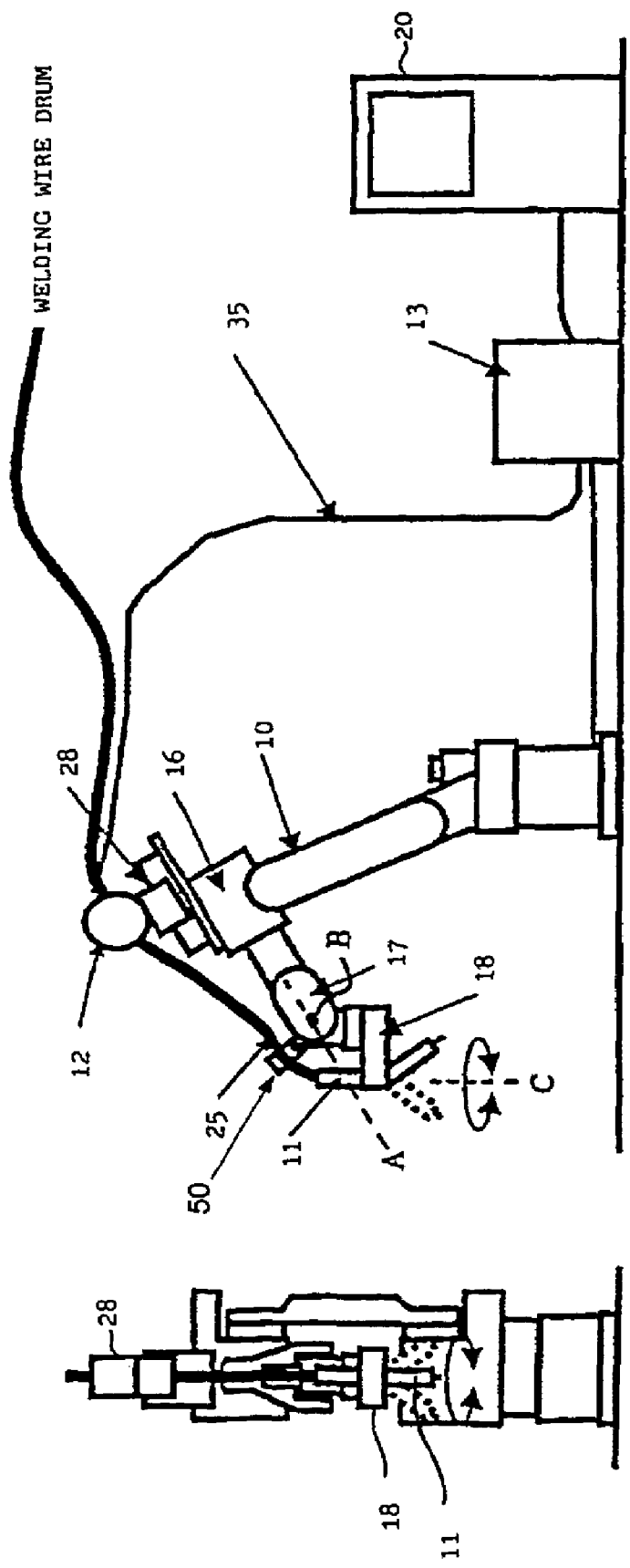

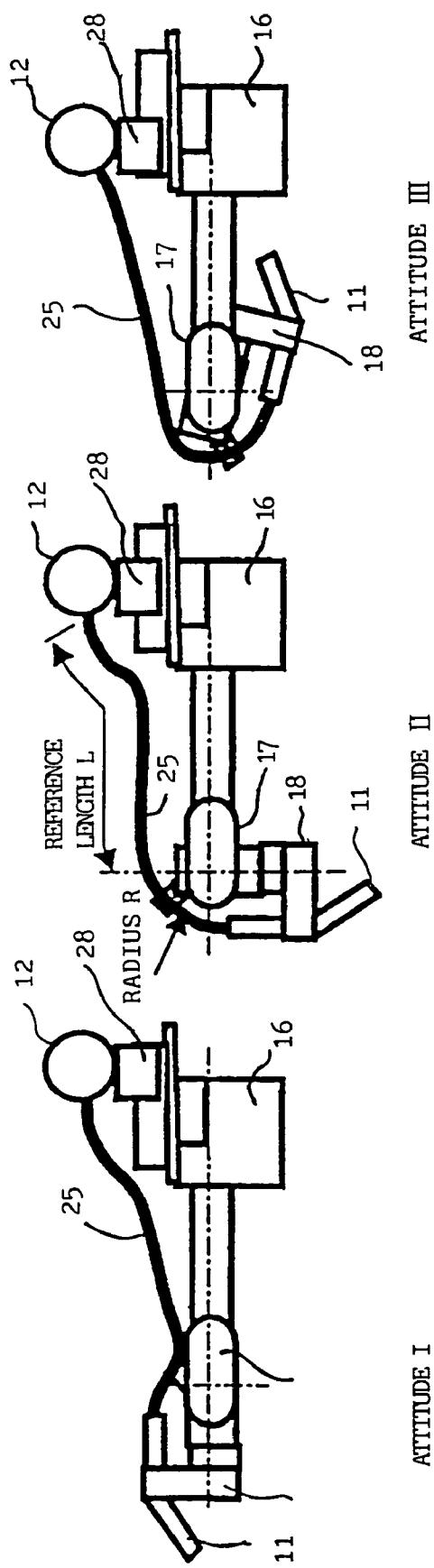

TORCH CABLE ACCOMMODATING STRUCTURE OF ARC WELDING ROBOT

BACKGROUND OF THE INVENTION

1. Field of the Invention

The present invention relates to a torch cable accommodating structure in an industrial robot mounted with a torch for arc welding.

2. Description of the Related Art

As one of typical applications of a robot, there is an arc welding robot. The arc welding robot is an industrial robot which has a torch for arc welding (hereinafter, referred to as "a welding torch" simply) mounted in the vicinity of a distal end of an arm thereof for performing an arc welding on a workpiece.

In an actual working site using an arc welding robot, there may by a case where a welding workpiece must be conducted in a state where an arm of the arc welding robot has been inserted in a narrow space such as a space in a workpiece, a space in a jig or a space in a peripheral device. In such a case, a problem of interference tends to occur in association with movement of the arc welding robot. In particularly, a torch cable connected to a welding torch has a high possibility that it interferes with a workpiece, a jig or a peripheral device in the vicinity of the torch cable, as compared with the distal end portion of a robot arm or the welding torch moving in a relatively narrow range. One of the reasons is that the torch cable is loosely taken about a robot mechanical section in order to secure a feeding stability of the welding wire and an area where the welding cable interferes with the periphery thereof becomes broad correspondingly.

Further, in case where a program for arc welding is prepared in an off-line manner, movement of the arm or the welding torch, an action of a wire feeding apparatus or the like can be simulated but it is difficult to simulate movement of the torch cable between the welding torch and the wire feeding apparatus. This fact is due to such circumstances that a behavior of the torch cable varies largely according to the attitude of axis of a wrist of the robot, the behavior may change with time because of its flexibility and the like. Accordingly, in a stage where the program for arc welding is prepared in off-line, it is not easy to accurately estimate an interference possibility between the torch cable and peripheral objects in advance.

Under these circumstances, there have been several proposals regarding the problem about interference of a torch cable. For example, in Japanese Patent Application Laid-Open No. 09-216189, there is a description about a constitution that a welding torch is provided rotatably about a parallel axis offset from a robot final rotating axis by a predetermined amount and the degree of rotational freedom of the welding torch is increased. Further, in Japanese Utility Model Application Laid-Open No. 05-28563, there has been proposed such a structure as shown in FIGS. 1A and 1B.

As illustrated in FIG. 1A showing a front view of an entire structure, a torch is attached to the distal end of a robot wrist and a wire feeding apparatus which feeds a welding wire to the welding torch via a torch cable is mounted to a supporting base for a robot arm. The wire feeding apparatus can advance and retraction-adjustable (or, is slidable) along the welding wire via a shift unit which is position-controlled by a control section of the robot arm.

In the art described in the above-described Japanese Patent Application Laid-Open No. 09-216189, however, when an attitude of an axis of the robot wrist is changed, as shown by a dotted line in FIG. 1A and FIG. 1B, there is a problem that the behavior of the torch cable changes largely to interfere with the periphery thereof. Further, in the art described in Japanese Utility Model Application Laid-Open No. 05-28563, since a torch cable projects relative to a front arm, there is a high possibility that the cable interferes with the periphery. That is, when the attitude of the welding torch is changed, the welding torch is pivoted relative to the front arm. Therefore, in a case in which the attitude of the welding torch is changed during welding of a workpiece, there may occur a problem of obstructing a welding workpiece such that the torch cable is excessively pulled and twists about the front arm, or the torch cable excessively loosens and its curvature changes largely, which causes inadequate feeding of the welding wire.

Further, when the attitude of the welding torch is changed, there is a problem that the behavior of the torch cable changes largely so that the torch cable interferes with a workpiece, a jig and a peripheral device.

SUMMARY OF THE INVENTION

In the present invention, a welding torch is supported rotatably about a parallel axis offset from a final rotating axis of a robot by a predetermined amount and a wire feeding apparatus is mounted slidably on a front arm of the robot. Thereby, there is provided a torch cable accommodating structure for an industrial arc welding robot where, even when the attitude of the welding torch changes, the behavior of a torch cable does not vary largely so that interference of the torch cable with a workpiece, a jig and a peripheral device can be suppressed to the minimum, and a stable welding wire feeding can be realized.

In other words, in the present invention, by setting a position where a welding torch is rotatably supported to a position offset from the final rotating axis of a robot by a predetermined amount and carrying out position control by mounting the wire feeding apparatus to a supporting portion of the front arm via a slide mechanism, the torch cable is prevented from be excessively pulled to twist about the front arm and from being excessively loosened to cause a large change of the curvature of the torch cable. Further, through such a position control, a possibility of occurrence of such an interference is lowered and a welding workpiece in a narrow space is made possible.

A torch cable accommodating structure for an arc welding robot according to the present invention comprises: a first wrist element provided at a distal end of a front arm rotatably about a first axial line in a longitudinal direction of the front arm; a second wrist element provided on the first wrist element rotatably about a second axial line crossing approximately vertically to the first axial line; and a welding torch provided on the second wrist element rotatably about a third axial line approximately vertical to the second axial line spaced from the first axial line by a predetermined distance.

In a first aspect of the torch cable accommodating structure for an arc welding robot according to the present invention, a wire feeding apparatus is mounted on the front arm via a slide mechanism which can reciprocate in a direction approximately parallel to the first axial line.

Here, it is preferable that a guide member for restricting movement of the torch cable is provided on the first wrist element or the second wrist element between the wire feeding apparatus and the welding torch. It is preferable that drive of the slide mechanism is conducted by, for example, a servomotor. In the case, such means for driving the slide mechanism by the servomotor on the basis of a rotational position of the first wrist element with respect to the front arm about the first axial line and a rotational position of the second wrist element with respect to the first wrist element about the second axial line to change the position of the wire feeding apparatus can be provided.

Further, in a second aspect of the torch cable accommodating structure for an arc welding robot according to the present invention, a wire feeding apparatus is mounted on the first wrist element via a slide mechanism which can reciprocate in a direction approximately parallel to the first axial line.

Here, it is preferable that a guide member for restricting movement of the torch cable is provided on the first wrist element or the second wrist element between the wire feeding apparatus and the welding torch. It is preferable that drive of the slide mechanism is conducted by a servomotor. In this case, means for driving the slide mechanism by the servomotor on the basis of a rotational position of the second wrist element with respect to the first wrist element about the second axial line to change the position of the wire feeding apparatus can be provided.

According to the present invention, a torch cable accommodating structure for an arc welding robot is improved so that a torch cable (a welding cable) is prevented from being excessively pulled or loosed, thereby attaining a stable feeding of a wire, and even if the attitude of a welding torch changes, the behavior of the torch cable is prevented from changing largely so that interference of the torch cable with a peripheral object can be suppressed to the minimum.

BRIEF DESCRIPTION OF THE DRAWINGS

The above and other objects and features of the present invention will be apparent from the following description of embodiments with reference to the attached drawings, in which:

FIG. 2A is a front view showing a system constitution of an industrial arc welding robot having a torch cable accommodating structure according to one embodiment of the present invention, and FIG. 2B shows a right side view of the system constitution shown in FIG. 2A;

FIG. 6A to FIG. 6C are front views showing behaviors of the torch cable assumed when the welding torch takes attitudes I, II and III respectively.

DESCRIPTION OF THE EMBODIMENTS

Figure 1A:
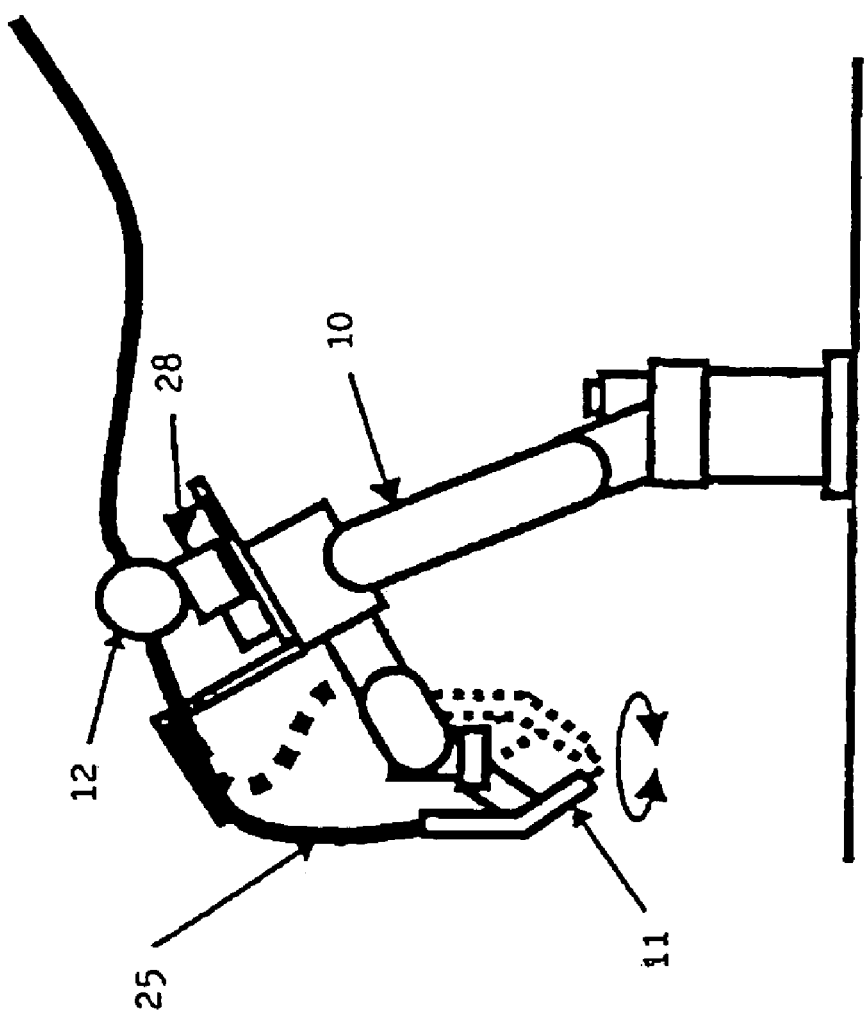
FIG. 1A is a front view for explaining the entire of a conventional arc welding robot.
Figure 1B:
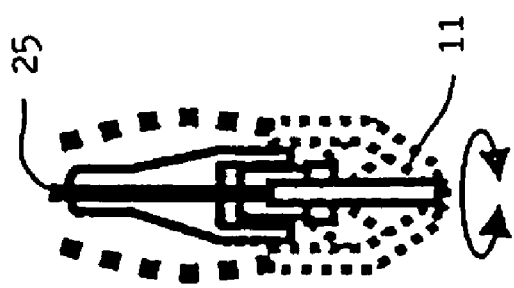
FIG. 1B is a side view showing a periphery of a torch attitude in the welding robot of FIG. 1A.

FIG. 2A and FIG. 2B are views showing a system constitution of an industrial arc welding robot having a torch cable accommodating structure according to one embodiment of the present invention. The system constitution of the industrial arc welding robot includes an arc welding robot (a robot mechanical section 10), a welding torch 11, a wire feeding apparatus 12, a welding power source 13 and a robot controller 20. The arc welding robot is a robot having the degree of freedom of six axes. Each axis is driven by a servomotor controlled by the robot controller 20 in a well-known aspect.

An operation program is taught to the robot controller 20, and the welding torch 11 mounted in the vicinity of a distal end of a wrist is moved to a target position according to the operation program and it performs an arc welding on a workpiece (for example, a joint (not shown)) with a designated attitude. Driving control of each servomotor conducted by the robot controller 20 is conducted via a control cable connecting the robot controller 20 and each servomotor in a known aspect.

When the robot mechanical section 10 from a front arm 16 to a distal end of the wrist is viewed, a first wrist element 17 is provided at a distal end of the front arm 16 so as to be rotatable about a first axial line A extending in a longitudinal direction of the front arm 16, and a second wrist element 18 is further provided at the first wrist element 17 so as to be rotatable about a second axial line B. The second axial line B is set so as to cross approximately vertically to the first axial line A. The welding torch 11 is supported at the second wrist element 18 so as to be approximately vertical to the second axial line B and to be rotatable about a third axial line C spaced from the first axial line A by a predetermined distance.

Figure 3:
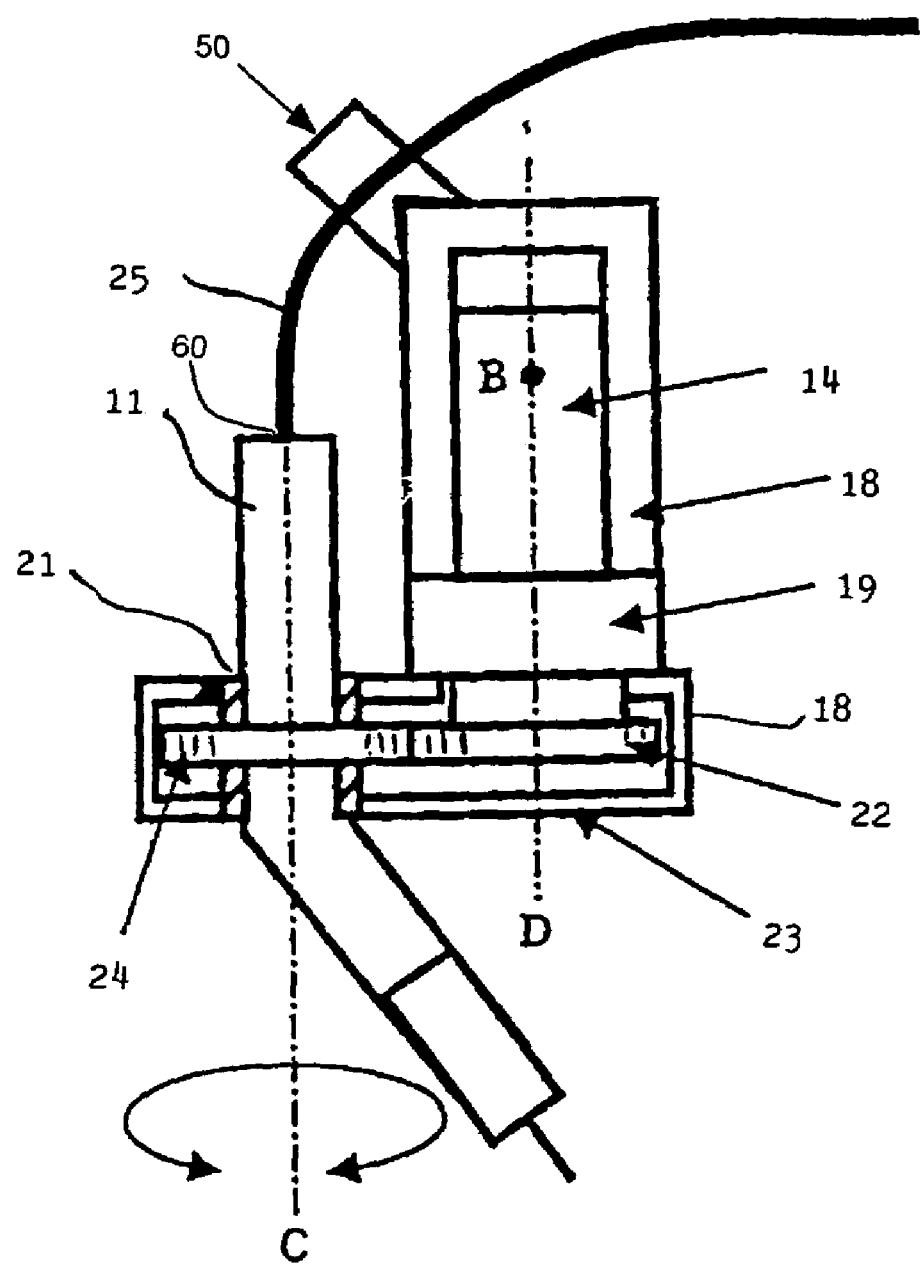
FIG. 3 is a front view of a welding torch supporting/rotating mechanism used in this embodiment.

An outline of a supporting/rotating mechanism for the welding torch 11 is shown in FIG. 3. The second wrist element 18 is provided with a servomotor 14 for the sixth axis driving, and a reduction gear mechanism 19 is coupled to the servomotor 14. The reduction gear mechanism 19 houses a bearing 21 supporting a flange on the output side (hereinafter referred to as output flange). The output flange, which is rotated about an axial line D via the servomotor 14 and the reduction gear mechanism 19, is connected with an input gear 22.

Further, a gear box 23 is mounted at a base portion of the output flange, and the welding torch 11 is mounted so as to be rotatable about the axial line C which is vertical to the axial line B and spaced from the axial line A by the predetermined distance via the bearing 21. The axial line C is parallel to the axial line D which is orthogonal to the axial line B. The axial line C is spaced from the axial line D by a fixed distance.

An output gear 24 united with a rotational shaft of the welding torch 11 is mounted so as to mesh with the input gear 22. Thereby, the orientation of the welding torch 11 can be freely rotated and controlled in response to a command from the robot controller 20. In this example, a rotational force transmission conducted by the gears has been shown, but another power transmission element such as a constitution using a belt and a pulley can be used.

Further, for accommodating such a case that an attitude is changed about an axis extending in the longitudinal direction of the welding torch 11, it is preferable that a coupling portion 60 between the welding torch 11 and the torch cable 25 is supported in a rotatable state. With such a constitution, even if the welding torch 11 is rotated about a torch axis, a bending force is not applied to the torch cable 25.

In order to feed a welding wire 27 (see FIG. 5) to the welding torch 11 rotatably supported as described above, a slide mechanism 28 which can reciprocate along a direction approximately parallel to the first axial line A is provided at a proper position from an upper side of the front arm 16 of the robot and an upper side of the first wrist element 17, and the wire feeding apparatus 12 is mounted via the slide mechanism 28. In the embodiment shown in FIGS. 2A and 2B, an example that the slide mechanism 28 is provided on the front arm 16 is illustrated.

Figure 4:
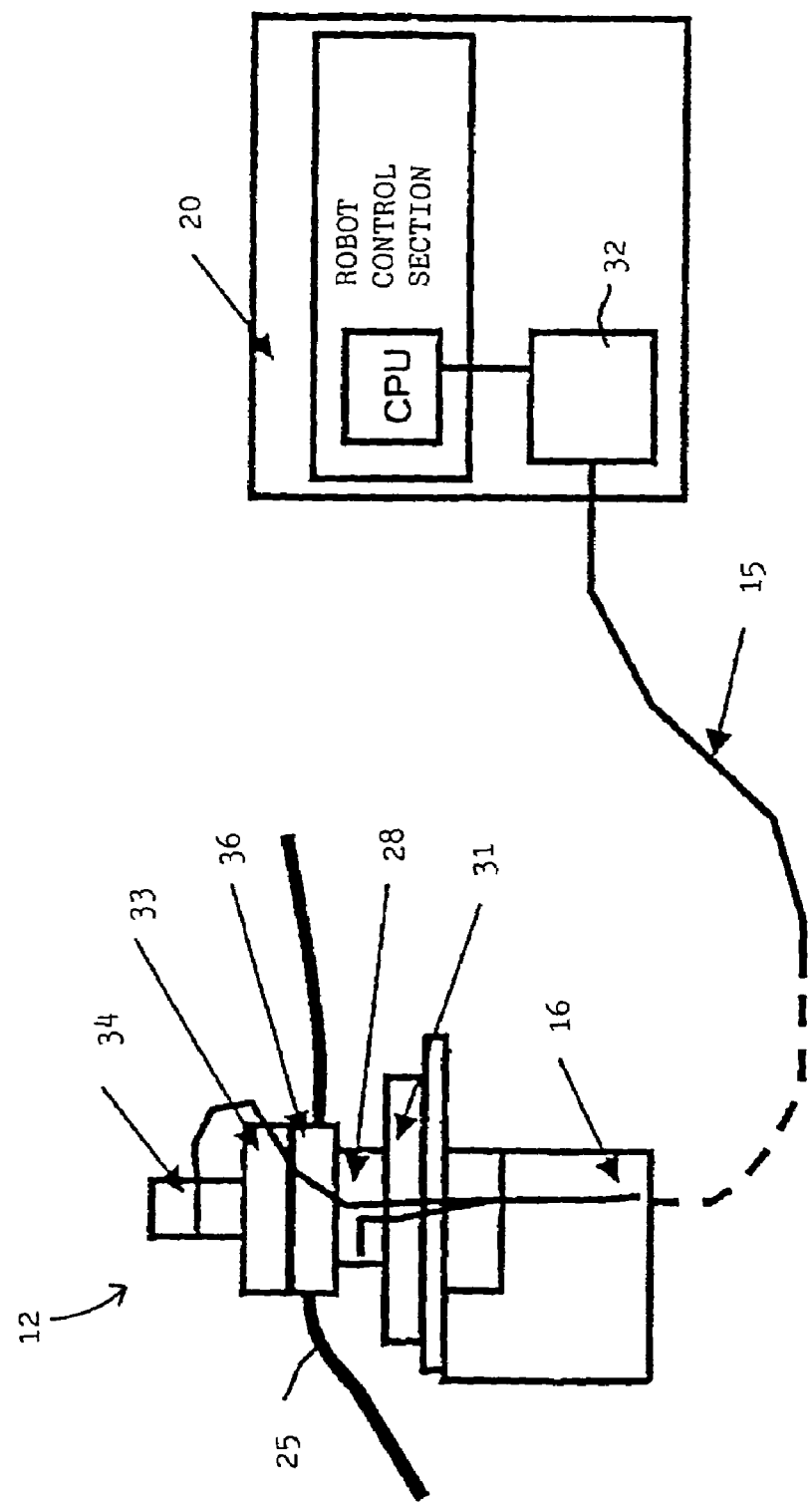
FIG. 4 is a front view for explaining a wire feeding apparatus sliding mechanism used in this embodiment and control thereof.

FIG. 4 is a diagram for explaining the slide mechanism 28 for moving the wire feeding apparatus 12 and a control therefor. A supporting base 31 is provided at a rear upper end of the front arm 16, the slide mechanism 28 (a linear motor slider) is mounted on the supporting base 31, and the wire feeding apparatus 12 is further mounted thereon. The slide mechanism 28 comprises a linear motor with a linear gauge and a linear guide. The linear motor is connected with the robot controller 20 via a control cable 15. An amplifier 32 for an added axis is provided inside the robot controller 20, so that a linear motor for driving the slide mechanism 28 is driven by the amplifier 32 for an added axis. A control aspect will be described later. Incidentally, in the embodiment, the linear motor is adopted for driving the slide mechanism 28, but such a driving can be realized by a combination of a servomotor and a ball screw for converting rotation of the servomotor into a linear movement.

On the other hand, the wire feeding apparatus 12 comprises the servomotor 34, a reduction mechanism 33 which reduces an rotational output of the servomotor 34 to transmit the reduced rotational output to a feeding roller, and the wire feeding mechanism 36 which feeds the welding wire 27 by the feeding roller. The servomotor 34 is connected to the robot controller 20 via the control cable 15, and it is controlled by the robot controller 20 in response to a command to the welding power source 13. That is, the robot controller 20 outputs a welding command to the welding power source 13 simultaneously with an operation command to the above servomotor 34. In response to a welding command, the welding power source 13 controls a welding voltage and a welding current at a welding wire portion positioned at the distal end of the welding torch 11 in synchronism with an action of the robot and actuates the wire feeding apparatus 12 to pull the welding wire 27 out of a welding wire drum and feed the welding wire 27 to the welding torch 11.

Incidentally, if necessary, in order that a flexible torch cable 25 can move in a longitudinal direction of the front arm 16 smoothly when the wire feeding apparatus 12 slides, the torch cable 25 can be guided by a guide member 50 in at least one position on the first wrist element 17 or the second wrist element 18. Further, in recent years, the wire feeding apparatus 12 is being advanced toward a small sizing due to application of a servo-system thereto. When using the wire feeding apparatus 12 applied with such a system, it is also possible to attain stable feeding of the welding wire 27 by mounting the wire feeding apparatus 12 on the first wrist element 17 to shorten a distance between the welding torch 11 and the wire feeding apparatus 12.

Figure 5:
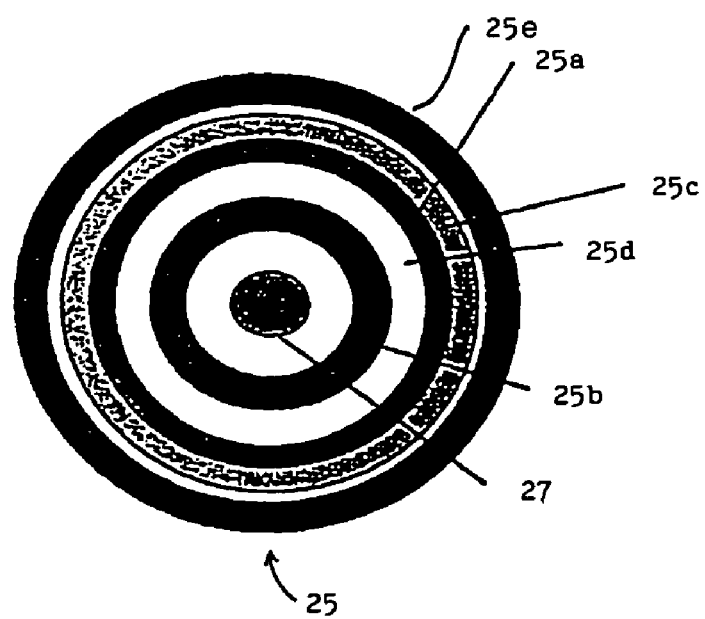
FIG. 5 is a sectional view exemplifying a schematic structure of a torch cable used in this embodiment.

Regarding the torch cable 25 used for feeding the wire from the wire feeding apparatus 12 to the welding torch 11 and for supplying power for welding, for example, a cable having a sectional structure shown in FIG. 5 can be used. As illustrated in the figure, the torch cable 25 has a double structure using two inner and outer sheaths 25a and 25b. A welding wire feeding spring 25e is provided inside the inner sheath 25a. The welding wire feeding spring 25e is wound spirally so as to form a tunnel-like passage for surrounding the vicinity of a sectional center of the torch cable 25, and the welding wire 27 can freely pass through the interior of the tunnel-like passage.

Furthermore, a power cable 25c is provided between the inner sheath 25a and the outer sheath 25b. The power cable 25c is a power cable for supplying power for welding to the welding torch 11, and it is electrically connected to a power supplying cable 35 inside the wire feeding apparatus 12 while being electrically connected to the welding wire 27 inside the welding torch 11. Moreover, a space 25d is secured inside the inner sheath 25a, and assist gas (inert gas) supplied from an assist gas source (not shown) flows in a passage formed by the space 25d. The assist gas flowing in the assist gas passage is blown from an opening at a distal end of the welding torch 11 toward a portion of a workpiece to be welded.

Next, a control conducted when an attitude of the welding torch 11 is changed during a welding workpiece under the above constitutions and functions will be explained. In this case, a CPU in the robot controller 20 computes an end point on the side of the welding torch 11 of the torch cable 25 from the positions of the first wrist element 17 and the second wrist element 18 by using a software. From the computation result, a slide position of the wire feeding apparatus 12 is controlled such that a distance between the end point on the side of the welding torch 11 of the torch cable 25 and the end point on the side of the wire feeding apparatus 12 thereof is always constant.

Here, the distance between the end point on the side of the welding torch 11 of the torch cable 25 and the end point on the side of the wire feeding apparatus 12 thereof is determined from the position of the first wrist element 17 and the position of the second wrist element 18 relative to the front arm 16, when the wire feeding apparatus 12 is mounted on the front arm. As described above, however, when the wire feeding apparatus 12 is mounted on the first wrist element 17, the distance is determined from the position of the second wrist element 18 relative to the first wrist element 17.

FIG. 6 shows a behavior of the torch cable 25 taken when the position of the second wrist element 18 has been changed under such a control. In FIG. 6, it is assumed that the position of the first wrist element 17 is fixed, for simplification of explanation and for allowing the explanation to be applied to even a case where the wire feeding apparatus 12 is mounted on either one of the front arm 16 and the first wrist element 17.

Considering three robot positions as the position of the second wrist element 18, the attitudes of the robot corresponding to the respective positions are defined as attitude I, attitude II and attitude III. Here, the attitude II corresponds to an ordinary robot attitude, and a proper length of the torch cable (a distance between the welding torch 11 and the wire feeding apparatus 12) at this time is defined as a reference length L. Further, the attitude I corresponds to a robot attitude taken when the second wrist element 18 has been rotated at an angle of about 90° and moved such that the welding torch 11 further separates from the distal end of the front arm, as compared with the attitude II, and the attitude III corresponds to a robot attitude when the second wrist element 18 has been rotated at an angle of about 90° such that the welding torch 11 approaches to the distal end of the front arm 16, as compared with the attitude II.

The robot controller 20 always monitors the positions of the front arm 16, the first wrist element 17 and the second wrist element 18. Incidentally, in the case that the wire feeding apparatus 12 is mounted on the first wrist element 17, only the positions of the first wrist element 17 and the second wrist element 18 may be always monitored. As another example, in a case where the attitude II is assumed as an initial state and the attitude is changed from the attitude II to the attitude I, when "R" is defined as a radius of curvature of the curved torch cable 25, the position of the wire feeding apparatus 12 is moved backward by a distance of $2\pi R/4$. Thereby, a distance change between the welding torch 11 and the front arm 16 (when the slide mechanism 28 is mounted on the front arm 16) or the first wrist element 17 (when the slide mechanism 28 is mounted on the first wrist element 17) is prevented from occurring due to the attitude change of the robot, so that a proper extending state of the torch cable (a state of the torch cable which is neither tensioned nor loosened excessively) is maintained while the torch cable length (the distance between the welding torch 11 and the wire feeding apparatus 12) remains to be the reference length L.

On the contrary, in case where the attitude II is assumed as an initial state and the attitude has been changed from the attitude II to the attitude III, the position of the wire feeding apparatus 12 is moved forward by a distance of $2\pi R/4$. Thereby, a distance change between the welding torch 11 and the front arm 16 (when the slide mechanism 28 is mounted on the front arm 16) or the first wrist element 17 (when the slide mechanism 28 is mounted on the first wrist element 17) is prevented from occurring due to the attitude change of the robot, so that a proper extending state of the torch cable (or a state of the torch cable which is neither tensioned nor loosened excessively) is maintained while the torch cable length (or the distance between the welding torch 11 and the wire feeding apparatus 12) remains to be the reference length L.

Thus, the robot controller 20 always monitors the positions of the front arm 16, the first wrist element 17 and the second wrist element 18 (or the positions of the first wrist element 17 and the second wrist element 18) to process feedback information thereabout at real time and perform such a control that the position of the wire feeding apparatus 12 is always kept optimal. For this reason, a calculation equation (a software) for obtaining a distance between the end point on the side of the welding torch 11 of the torch cable 25 and the end point thereof on the side of the wire feeding apparatus 12 is prepared in the robot controller 20, and an optimal position of the wire feeding apparatus 12 is calculated in the robot controller 20.

According to the embodiment, such an event can be prevented that the torch cable 25 is pulled excessively to twist about the front arm 16, on the contrary, the torch cable 25 is loosened excessively so that its curvature changes largely. Further, as described above, by providing the welding torch 11 rotatably about the third axial line approximately vertical to the second axial line and spaced from the first axial line by the predetermined distance, the torch cable 25 can be mounted compactly such that a large change hardly occurs in behavior of the torch cable 25 at a change time of the attitude of the welding torch 11.

Accordingly, interference of the torch cable with a workpiece, a jig and a peripheral device can be suppressed to the minimum, and a welding workpiece in a narrow clearance in a workpiece, a jig and a peripheral equipment canal so be performed stably.

As explained above, according to the accommodating structure for a torch cable according to the present invention, such an event can be prevented that a torch cable is pulled excessively to twist about a front arm or the torch cable is loosened excessively so that its curvature changes large. As a result, a stable feeding of a welding wire is made possible and a welding workpiece can be performed stably. Further, even if the attitude of a welding torch changes, the torch cable can be mounted compactly such that the behavior of the torch cable does not change largely, so that interference of the torch cable with a workpiece, a jig and a peripheral equipment can be suppressed to the minimum and it is made easy to perform a welding workpiece in a narrow clearance in a workpiece, a jig and a peripheral equipment.

The invention claimed is:

1. An arc welding robot comprising a mechanical section, and a welding torch cable accommodating structure comprising:
   a front arm whose proximal end is provided on the mechanical section;
   a first wrist element which is provided on the distal end of the front arm and is rotatable with respect to the mechanical section about a first axial line extending in a longitudinal direction of the front arm;
   a second wrist element provided on the first wrist element so as to be rotatable about a second axial line crossing substantially perpendicularly to the first axial line;
   a welding torch provided on the second wrist element so as to be rotatable about a third axial line which extends substantially perpendicularly to the second axial line and is spaced from the first axial line by a predetermined distance;
   a slide mechanism which is provided on the front arm and can move forwards and backwards in a direction substantially parallel to the first axial line;
   a welding wire feeding apparatus mounted on the slide mechanism; and
   a guide member provided on the second wrist element for restricting the movement of a torch cable;
   wherein the torch cable is supported in a rotatable state at a coupling portion between the torch cable and the welding torch.

2. The arc welding robot according to claim 1, wherein a guide member for restricting movement of the torch cable is provided on one of the first wrist element and the second wrist element between the wire feeding apparatus and the welding torch.

3. The arc welding robot according to claim 1, further comprising means for changing the position of the wire feeding apparatus by driving the slide mechanism through a linear motor, based on the rotational position of the second wrist element with respect to the first wrist element about the second axial line.

4. The arc welding robot according to claim 1, further comprising means for changing the position of the wire feeding apparatus by driving the slide mechanism through a servomotor, based on the rotational position of the second wrist element with respect to the first wrist element about the second axial line.

5. An arc welding robot comprising a mechanical section, and a welding torch cable accommodating structure comprising:
   a front arm whose proximal end is provided on the mechanical section;
   a first wrist element which is provided on the distal end of the front arm and is rotatable with respect to the mechanical section about a first axial line extending in a longitudinal direction of the front arm;
   a second wrist element provided on the first wrist element so as to be rotatable about a second axial line crossing substantially perpendicularly to the first axial line;
   a welding torch provided on the second wrist element so as to be rotatable about a third axial line which extends substantially perpendicularly to the second axial line and is spaced from the first axial line by a predetermined distance;

a slide mechanism which is provided on the first wrist element and can move forwards and backwards in a direction substantially parallel to the first axial line;

a welding wire feeding apparatus mounted on the slide mechanism; and a guide member provided on the second wrist element for restricting the movement of a torch cable;

wherein the torch cable is supported in a rotatable state at a coupling portion between the torch cable and the welding torch.

6. The arc welding robot according to claim 5, wherein a guide member for restricting movement of the torch cable is provided at one of the first wrist element and the second wrist element between the wire feeding apparatus and the welding torch.

7. The arc welding robot according to claim 5, further comprising means for changing the position of the wire feeding apparatus by driving the slide mechanism through a linear motor, based on the rotational position of the second wrist element with respect to the first wrist element about the second axial line.

8. The arc welding robot according to claim 5, further comprising means for changing the position of the wire feeding apparatus by driving the slide mechanism through a servomotor, based on the rotational position of the second wrist element with respect to the first wrist element about the second axial line.

* * * * *

UNITED STATES PATENT AND TRADEMARK OFFICE
CERTIFICATE OF CORRECTION

| | | |
|---|---|---|
| PATENT NO. | : 7,105,771 B2 | Page 1 of 1 |
| APPLICATION NO. | : 10/753565 | |
| DATED | : September 12, 2006 | |
| INVENTOR(S) | : Toshihiko Inoue et al. | |

It is certified that error appears in the above-identified patent and that said Letters Patent is hereby corrected as shown below:

FIG. 6A, add --18-- to the line closest to torch "11".

FIG. 6A, add --17-- to the reference line closest to arm "16".

Column 7, Line 56, change "canal so" to --can also--.

Signed and Sealed this

First Day of May, 2007

JON W. DUDAS
*Director of the United States Patent and Trademark Office*